Dec. 14, 1965 W. T. RENTSCHLER ETAL 3,223,010
PHOTOGRAPHIC CAMERA WITH RETRACTABLE PHOTOFLASH REFLECTOR
Filed May 27, 1964 2 Sheets-Sheet 1

INVENTORS
Waldemar T. Rentschler
Willy Pross
BY
Arthur A. March
ATTORNEY

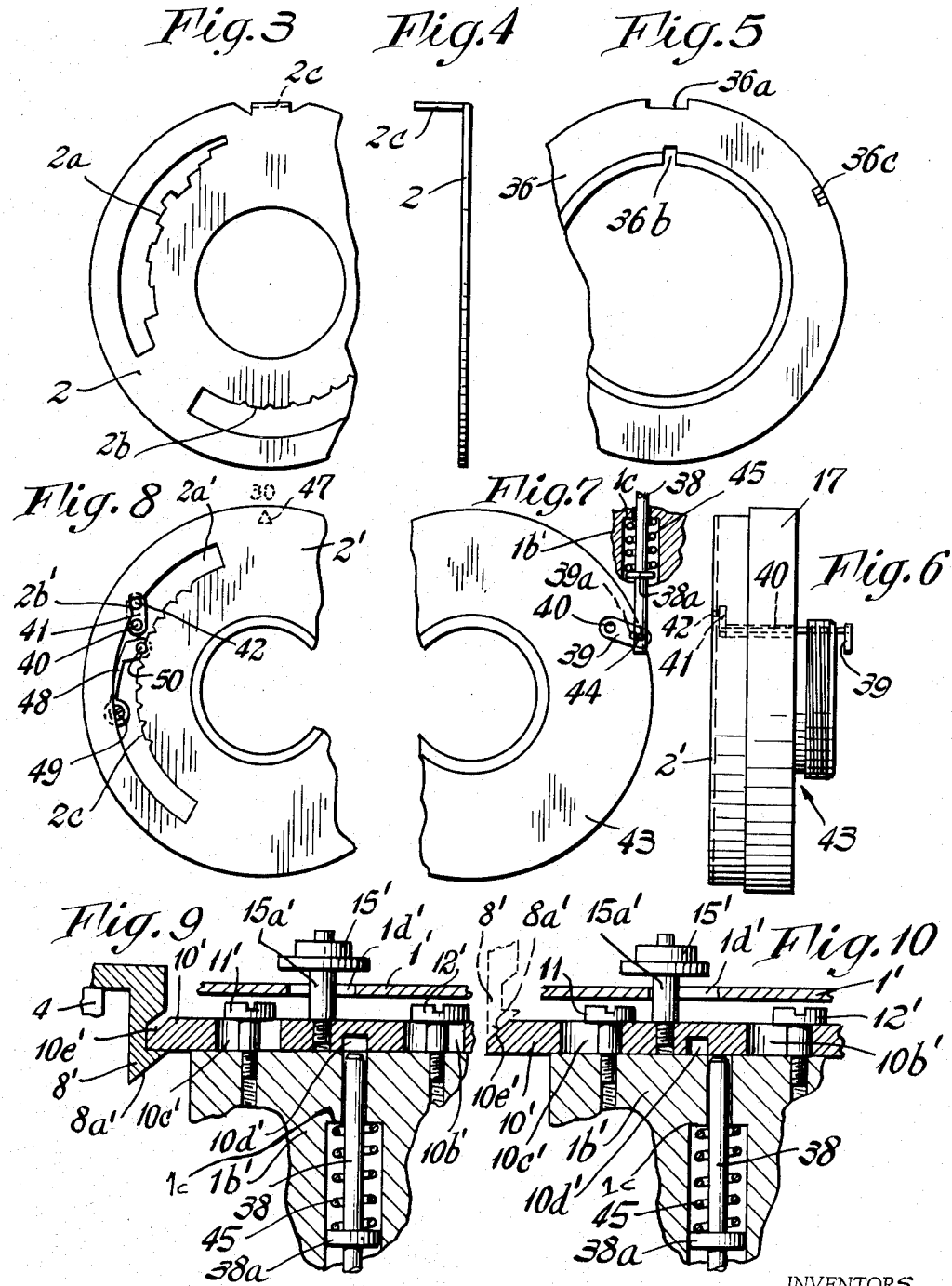

United States Patent Office 3,223,010
Patented Dec. 14, 1965

3,223,010
PHOTOGRAPHIC CAMERA WITH RETRACTABLE PHOTOFLASH REFLECTOR
Waldemar T. Rentschler and Willy Pross, both of Calmbach (Enz), Germany, assignors to Alfred Gauthier, G.m.b.H., Calmbach (Enz), Germany, a corporation of Germany
Filed May 27, 1964, Ser. No. 370,638
Claims priority, application Germany, May 29, 1963, G 37,842
7 Claims. (Cl. 95—11)

This invention relates to a photographic camera having an exposure time setting member and a built-in photoflash unit with a retractable reflector, which can be extended for taking photoflash exposures.

Cameras with retractable photoflash reflectors have been constructed heretofore without any connection between the reflector and the shutter speed control. The reflector has merely been extracted from the camera case by hand or by means of a spring-operated device controlled by a locking bolt and the shutter speed control has been set separately. However, it was found that many photographers forgot to set the shutter speed properly and thus made faulty exposures.

It is one of the principal objects of this invention to provide a photographic camera having a retractable reflector and means associated to the reflector and the shutter speed control of the camera so that the reflector can be extended only if the proper exposure time has previously been set.

Another object has been to arrange the connection between the reflector and the shutter speed control so that, once the reflector is extended, the control cannot be moved out of the proper photoflash position until the reflector is retracted.

Other objects will become apparent from the following specification.

In accordance with this invention, a camera having a built-in photoflash unit including a bulb socket and a retractable reflector is provided with means cooperating with the shutter speed control and the reflector so that the reflector can be extended only when the shutter speed control is set to the proper exposure time for making photoflash exposures, for example, 1/30 second. Moreover, the interlocking means also prevents the shutter speed control from being changed to a different exposure time once the reflector has been extended into operating position. Thus setting of the proper exposure time is insured for every photoflash exposure.

In one embodiment of the invention where at a camera the reflector is extended by means of a spring controlled by a locking bolt, or latch, which is provided with a notch, or detent, or recess, a lever engages the detent to control the movement of the bolt and is, in turn, actuated by a control cam synchronously movable with the shutter speed control so that when the latter is set for the proper exposure time for photoflash pictures, suitable means, such as a pressure pin or the like, actuates the lever and removes it from engagement with the locking bolt. The shutter speed control is governed by a further member, which may take the form of a resiliently biased slide or pin arranged to be moved by the reflector. This member controls the shutter speed control, for example, through the medium of a counter-member that is moved synchronously with the shutter speed control. The counter-member may be provided with a radial opening or recess so that the end of the resiliently biased member, which end may be bent at an angle to the remainder of the member or may be in the form of a pin which faces the opening, can enter into the opening when the reflector is extended, and is removed from the opening when the reflector is retracted.

In order to be sure that the control cam and the counter-member move synchronously with the shutter speed control, the invention also may include provision for a sliding ring, or drag ring, which is associated with the shutter speed control so as to move therewith and which may comprise both the control cam provided for actuating the lever as well as the detent opening cooperating with the slide or pin.

A particularly simple embodiment of the invention, which includes parts of the foregoing features, comprises a slide that is mounted for axial displacement and is resiliently biased by a spring. One end of the slide engages the detent of the locking bolt while the other end is connected by means of an intermediate lever to a sensing lever associated with the shutter speed control. The sensing lever has a sensing pin and this pin is pushed by the aforementioned spring against a control cam concentric with the optical axis about which the shutter speed control roates. The control cam has a detent opening, or recess, and when the shutter speed control is set at the proper position for making a photoflash exposure, this dentent opening permits the sensing lever to rotate. By means of the intermediate lever, the slide is removed from engagement with the locking bolt. This embodiment may include provision that, after the reflector has been extended into its operating position, the locking bolt occupies a position which enables it to counteract the axial motion of the siide due to the displacement of the detent in the locking bolt. The reflector has a locking lug, or projection, which cooperates with the locking bolt to force the latter into a position in which the detent in the locking bolt is opposite the slide when the reflector is retracted.

The invention will be described in gerater detail hereinafter in connection with the drawings in which:

FIG. 3 shows the shutter speed control of the camera of FIGS. 1 and 2;

FIG. 4 is a different view of the control of FIG. 3;

FIG. 5 shows part of a ring that cooperates with the control of FIGS. 3 and 4;

FIG. 6 is a side view of a part of a shutter with a different embodiment of reflector arresting mechanism;

FIG. 7 shows another side of the shutter of FIG. 6;

FIG. 8 shows the shutter speed control that cooperates with the components shown in FIGS. 6 and 7;

FIG. 9 shows a partial cross-sectional view of a camera, including the shutter of FIG. 7; and FIG. 10 shows the apparatus of FIG. 9 at a different stage in the operation thereof.

Figure 1:
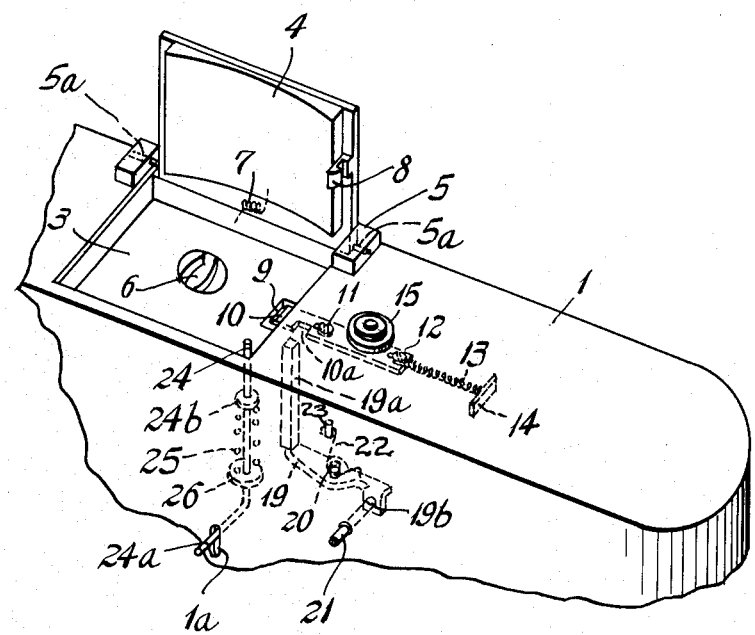
FIG. 1 shows one part of a camera constructed according to the invention and with several of the key internal components shown in dotted form.
Figure 2:
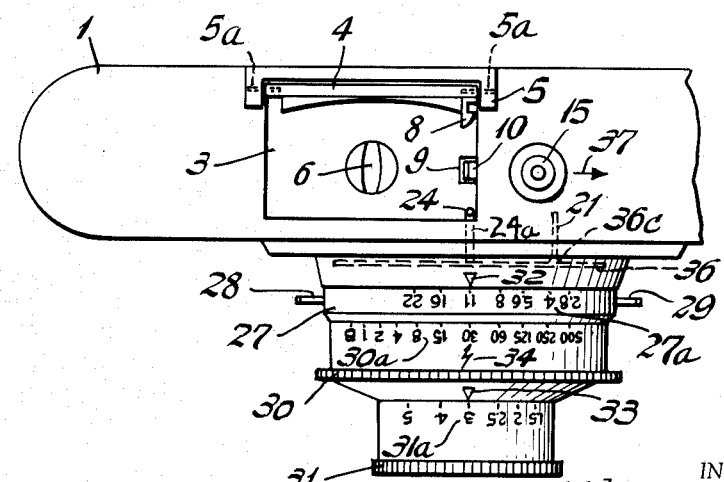
FIG. 2 is a top view of another part of the camera shown in FIG. 1.

In FIGS. 1 and 2 reference numeral 1 refers to a camera case or housing, including among other things an escapement mechanism, which is not shown, but which may be any suitable type for obtaining different exposure times including an exposure time which is especially suitable for making photoflash exposures. A setting member 2 for shutter speed control is connected to the escapement mechanism to govern its operation.

In the top of the camera case 1 is a rectangular recess 3 into which a reflector 4 for a photoflash lamp may be retracted when not in use. As may be observed, the front reflecting surface of the reflector 4 is curved with a circular or parabolic curvature so as to concentrate the light from the flashbulb on the scene to be photographed. The reflector is pivotally mounted in a fixed bearing 5 by means of pins 5a so that it can either swing upwardly into operating position, as shown in FIG. 1, or it can be retracted substantially flush with the upper surface of the case 1. A photoflash bulb socket 6 is located within the recess 3 in front of the curved reflector. A spring 7 is provided for biasing the reflector 4 to its extended position, except when the reflector is forcibly folded into, or retracted into the recess 3.

The reflector 4 is provided with a locking lug, or shoulder, or catch, 8 which serves to hold the reflector in its retracted position when the catch is forced into an opening 9 in the recess 3 and is engaged by a locking bolt, or latch, 10. The latter slides longitudinally under the guidance of two flat-headed screws 11 and 12 within the camera case 1. The latch 10, which is in the form of a bar, is attached to a compression spring 13, the other end of which presses against a fixed abutment 14 so as to urge the latch into position to engage the catch 8. The latch may be operated manually by means of a sliding button 15 on the upper surface of the camera case 1 to release the reflector 4 after certain prerequisites have been met.

Within the camera case is a lever 19 which has an arm 19a extending therefrom and into a detent opening, or notch, 10a in the locking bolt. This lever is pivotally mounted on a pin 20 and has a second arm 19b that engages the end of a sliding pressure pin 21 which extends through the front surface of the camera case 1 parallel to the optical axis of the lens assembly. A coil spring 22 is wound about the pin 20 so that one end of the spring is hooked over the lever 19, while the other end is hooked over a spring pin 23 thereby providing a spring force that tends to rotate the lever 19 so that the arm 19a engages the latch 10 and so that the pressure pin 21 is pushed out of the front surface of the camera case 1.

FIGS. 1 and 2 also show a feeler pin 24 that extends from inside of the camera case 1 into the recess 3 so as to be engaged by the reflector 4 when the latter is retracted, or closed. The lower end 24a of the pin 24 is bent at a right angle to the main part of the pin and extends through a slot 1a in the front surface of the camera case 1. A helical spring 25 surrounds the pin 24 and is held between a collar, or flange, 24b on the pin and a fixed abutment 26 to press the pin 24 and to urge the lower end 24a near or against the upper end of the slot 1a.

FIG. 2 shows several of the conventional members of an intra-lens shutter. There is a manual setting ring 27 with knobs 28 and 29 extending therefrom for controlling the operation of the diaphragm in accordance with a scale 27a. In addition, there is a shutter speed control ring 30 with a scale 30a and a focusing control ring 31 with a scale 31a. The diaphragm aperture scale 27a and the shutter speed control scale 30a are set with respect to a fixed mark 32, while the focusing scale 31a is set with respect to a fixed mark 33. One of the speed settings of the shutter speed scale 30a has a lightening mark 34 adjacent to it which indicates a speed of $\frac{1}{30}$ second and is the speed that has been selected as being especially suitable for making photoflash exposures. The operation of the photoflash lamp within the socket 6 is synchronized with this shutter speed, which will be referred to hereinafter as the photoflash speed.

FIGS. 3 and 4 show particularly the construction of the exposure time setting member 2 which, in this embodiment, is in the form of a flat ring having several openings, including a central opening, concentric with the optical axis. This setting member is coupled to the shutter speed control ring 30 so as to rotate therewith and it has a cam 2a for setting the individual exposure times as well as a plurality of detent notches 2b for accurately setting the cam 2a with respect to the elements that control the operating speed of the shutter. A lug 2c is bent at an angle to the main part of the setting member 2 and engages a notch 36a of a sliding, or drag, ring 36, which is shown in FIG. 5 and which is located on the rearward side of the shutter between the camera case and the setting member 2. These rings are connected together by the lug 2c to rotate simultaneously. A notch 36b on the inner circumference of the annular ring 36 is placed so as to receive the end 24a of the pin 24 shown in FIGS. 1 and 2, while a cam 36c extending parallel to the optical axis operates the sliding pin 21. The positions of the notch 36b and the cam 36c are such that they are opposite the end 24a and the pin 21, respectively, when the shutter speed control 30 is rotated to bring its photoflash time mark 34 opposite the fixed mark 32.

The mechanism of FIGS. 1 through 5 operates in the following manner:

Let it be assumed, to start, that the reflector 4 is retracted or folded into the recess 3. If any exposure time is set by means of the shutter speed control 30, except the photoflash time indicated by the mark 34, the spring 22 presses the arm 19a into the detent notch 10a and locks the latch 10 so that it is impossible to slide the button 15 in order to extract, or extend, or release, the reflector 4 from the recess 3.

On the other hand, if the shutter speed control 30 is reset so that the photoflash time mark 34 is opposite the fixed pointer 32, the cam 36c will press the pin 21 into the camera case 1 and pivot the lever 19 so that the arm 19a moves away from the latch 10. Simultaneously, the notch 36b is directly over the end 24a of the pin 24. As long as the reflector 4 is kept in its retracted position, the pin 24 cannot move up into the notch 36c, but if the sliding button 15 is operated so as to draw back the latch 10 in the direction of the arrow 37 in FIG. 2, the reflector 4 will be freed and will pop up under the force of the spring 7. This releases the pin 24 so that its lower end 24a can be forced by the spring 25 up into the notch 36b. The photoflash unit is ready to receive a flashbulb in the socket 6 and, as may be seen, the photoflash unit can only be brought to this condition when the shutter speed control 30 is properly set. Moreover, the engagement of the end 24a in the notch 36b prevents the shutter speed control 30 from being moved to a different position as long as the reflector remains extended.

If the photographer decides to change to a different exposure time, the reflector 4 must be retracted so that it presses the pin 24 downwardly to disengage the end 24a from the ring 36. The shutter speed control 30 may then be freely rotated to another position, and when it is so rotated, the cam 36c will release the pin 21 thereby permitting the lever 19 to rotate to the position in which its arm 19a engages the notch 10a and prevents the reflector 4 from being extended.

Another embodiment of a locking device is illustrated in FIGS. 6 to 10 in which only one load transmission member, which may take the form of a single slide 38, is used instead of the lever 19 and the pin 24 in FIGS. 1 and 2. One end of the slide 38 is connected with an intermediate lever 39 which is non-rotatably connected to a shaft 40. The other end of this shaft has a sensing lever 41 with a sensing pin 42 in its free end. As shown in FIG. 6, the shaft 40 extends parallel to the optical axis in the shutter housing 43 and the end that faces the camera projects from the housing. The intermediate lever 39 is attached to this end, while the sensing lever 41 is attached to the other end of the shaft. The intermediate lever has a slot 39a into which a cross pin 44 of the slide 38 fits. The slide 38 itself is slidably held within a portion 1b' of the camera case and is spring biased by a spring 45 which is compressed between a shoulder 1c of the camera housing and a flange, or collar, 38a. This resilient pressure tends to rotate the shaft 40 with its levers 39 and 41 in a clockwise direction, as shown in FIG. 7.

FIG. 8 shows the relationship between the sensing lever 41 and the exposure time setting member 2' which is indicated by the broken line in FIG. 6. The member 2' has an opening concentric with the axis of rotation, which is also the optical axis, and the perimeter of this opening defines a cam 2a'. A triangular detent 2b' is formed in one side of the opening 2a' and, as shown in FIG. 8, the sensing pin 42 rests within the detent 2b', which is the position that corresponds to the photoflash time that has been somewhat arbitrarily selected as 1/30 second and is indicated by the placement of the mark, or pointer 47, opposite the number "30," both the mark and the number being shown in dotted form because of the fact that they would not actually be seen in the position of the member 2' shown in FIG. 8. As may be noted, FIGS. 7 and 8 show opposite ends of the shaft 40, and the lever 39 appears in FIG. 7 while the lever 41 appears in FIG. 8. Consequently, a clockwise rotary motion of the sensing lever 41 in FIG. 8 corresponds to a counterclockwise rotary motion of the lever 39 in FIG. 7. FIG. 8 also shows a known type of stop spring 48 which is attached by means of a screw 49 and which carries a detent pin 50. This pin rides against the inner edge of the cam 2a' and engages a series of smaller detent openings 2c' so as to insure accurate settings of the individual exposure times.

The locking arrangement shown in FIGS. 9 and 10 is very similar to that of FIG. 1 and therefore similar reference numerals are used for parts corresponding to those in FIGS. 1 and 2, but with an apostrophe added. In FIGS. 9 and 10 there is a locking lug or catch 8' which is engaged by a latch, or locking bolt, 10' controlled by a sliding button 15' which is firmly attached to the latch. The camera case is indicated by reference numeral 1' and two flat-headed screws 11' and 12' are shown corresponding to the like-numbered screws in FIGS. 1 and 2. The screws 11' and 12' extend through two slots 10b' and 10c' of the latch 10' and are screwed into the part 1b' of the case. The only outwardly accessible and visible part of the mechanism is the slide button 15', the shaft 15a' of which extends through a slot 1d' of the camera case 1'. The movement of the latch 10' is limited by the lengths of the two slots 10b' and 10c' through which the screws 11' and 12' extend. The latch is urged to the left by a spring (not shown in the drawing) which corresponds to the spring 13 of FIG. 1.

The latch 10' also has a recess 10d' into which the end of the slide 38 is free to move when this recess is aligned with the channel in which the slide 38 is located. In order to force the latch 10' to move to the right when the reflector 4 is folded into the camera case, both the lug 8' and the latch 10' are provided with bevelled surfaces 8a' resp. 10e'. These surfaces meet as shown in FIG. 10 and the resultant force pushes the latch 10' to the right to permit the lug 8' to continue moving downwardly to reach, eventually, the position shown in FIG. 9, at which time the latch 10' springs leftward and into the notch in the lug 8'.

The embodiment of FIGS. 6 through 10 operates in the following manner.

It will be assumed that the reflector is in its retracted position and that the shutter speed control has been set to some shutter speed other than the photoflash time. In this case, the latch 10' is hooked into the recess in the lug 8' as shown in FIG. 9. The sensing pin 42 of the lever 41 is pressed against the cam 2a' by the spring 45, causing the slide 38 to extend into the opening 10d'. This locks the latch and prevents it from moving to the right, as would be required to extract the reflector 4. However, if the shutter speed control is turned to the photoflash time, the detent 2b' is placed opposite the sensing pin 42 so that the latter falls into the detent, which permits the slide 38 to move downwardly out of the opening 10d' under the force of the spring 45. This is the situation shown in FIG. 9. Once the slide 38 is out of the recess 10d', the latch 10' can be moved to the right by means of a button 15', thereby releasing the lug 8' and permitting the reflector 4 to spring up into the operating position. Upon releasing the button 15', the latch 10' will be pushed as far to the left as it can go into the position indicated in FIG. 10, thereby placing a solid portion of the latch 10' over the end of the slide 38 which is, thus, no longer able to move upwardly. As a result, the engagement between the sensing pin 42 and the detent 2b' is maintained and the exposure time-setting member 2' cannot be rotated, as would be required to change the shutter speed.

Upon returning the reflector 4 to its retracted position, which would normally be done after the photoflash exposure had been made but which could equally well be done without making a photoflash exposure if the photographer changed his mind and removed the photoflash bulb, the slanting surface 8a' presses against the slanting surface 10e' and moves the latch 10' to the right against the force of its spring. Eventually the position of FIG. 9 is reached with the reflector 4 fully retracted and with the recess 10d' directly over the slide 38 which is thus free to move upwardly and to permit the shaft 40 to rotate clockwise as shown in FIG. 8 or counterclockwise as shown in FIG. 7 so as to permit the pin 42 to become disengaged from the recess 2b' and thus free the exposure time-setting member 2' for rotation to any desired shutter speed. The latch 10' is thus locked in place by the slide 38 until the next time that the shutter speed control is set to its photoflash time.

What is claimed is:

1. A photographic camera comprising: a shutter speed control settable to a plurality of positions, one of said positions corresponding to a shutter speed suitable for taking photoflash exposures; a photoflash unit comprising a reflector retractable into said camera; and means connected to said reflector and to said shutter speed control to permit said reflector to be extended only when said control is in said one of said positions and to prevent said control from being moved out of said one of said positions when said reflector is extended.

2. A photographic camera comprising: a shutter speed control settable to a plurality of positions, one of said positions corresponding to a shutter speed suitable for taking photoflash exposures; a photoflash unit comprising a reflector retractable into said camera; latching means connected to said reflector; and a member connected to said shutter speed control and controlling said latching means to permit said reflector to be extended only when said control is in said one of said positions and to prevent said control from being moved out of said one of said positions when said reflector is extended.

3. A photographic camera comprising: a shutter speed control settable to a plurality of positions, one of said positions corresponding to a shutter speed suitable for taking photoflash exposures; a photoflash unit comprising a reflector retractable into said camera; a latch connected to said reflector; a member connected to said shutter speed control to move therewith; a notch in said member; a lever connected to said latch to lock the same in latched position to hold said reflector retracted when said shutter speed control is set to any of said positions except said one position; and means connecting said member to said lever to disconnect said lever from said latch to permit said reflector to be extended only when said control is in said one of said positions and to prevent said control from being moved out of said one of said positions when said reflector is extended.

4. A photographic camera comprising: a shutter speed control settable to a plurality of positions, one of said positions corresponding to a photoflash speed; a reflector retractable into said camera; a spring connected to said reflector to urge said reflector into its extended position; a latch engaging said reflector in the retracted position thereof; a detent in said latch; a lever located adjacent to said latch to pivot into said detent; a control cam connected to said shutter speed control to move therewith and to withdraw said lever from said detent when said shutter speed control is set at said photoflash speed; movable means connected to said shutter speed control to move therewith and having a recess; a pin; a spring urging said pin into engagement with said recess;

said recess being located so as to be engaged by said pin when said shutter speed control is set at said photoflash speed, said pin being engaged by said reflector when said reflector is in its retracted position to remove said pin from engagement with said recess to permit said shutter speed control to be moved through its plurality of positions and said reflector being removed from engagement with said pin when said reflector is extended whereby said pin moves into engagement with said recess to lock said shutter speed control at said photoflash speed.

5. The photographic camera of claim 4 in which said control cam is attached to said movable means connected to said shutter speed control.

6. A photographic camera comprising: a shutter speed control settable to a plurality of positions, one of said positions corresponding to a photoflash speed; a reflector retractable into said camera; a spring connected to said reflector to urge said reflector into its extended position; a latch engaging said reflector in its retracted position; a detent in said latch; a slide; a second spring urging said slide away from said detent; an intermediate lever connected to said slide and correspondingly urged in one direction of rotation by said second spring; a sensing lever; a sensing pin on said sensing lever; a control cam operatively connected to said shutter speed control to be moved thereby; a detent in said control cam, said detent being located to receive said sensing pin only when said control cam is positioned by said shutter speed control at a predetermined position corresponding to the position of said shutter speed control when said shutter speed control is set at the photoflash speed; and means connecting said sensing lever to said itnermediate lever to rotate simultaneously therewith and to be corresopndingly under the force of said second spring, whereby, when said shutter speed control moves said control cam to said predetermined position, said sensing pin moves into said detent in said control cam under pressure from said second spring, thereby rotating said sensing lever and said intermediate lever and pushing said slide away from said detent to free said latch to disengage said reflector.

7. A photographic camera according to claim 6 in which said reflector has a catch which engages said latch when said reflector is retracted, the spatial relationship of said latch and said catch being such as to move said detent in said latch into position to receive said slide when said reflector is retracted and said latch has a solid portion obstructing movement of said slide when said latch is in the position at which it moves when said reflector is extending.

References Cited by the Examiner
UNITED STATES PATENTS
2,783,696    3/1957    Sewing _____ 95—11

JOHN M. HORAN, *Primary Examiner.*